United States Patent [19]
Beranek et al.

[11] 3,908,284
[45] Sept. 30, 1975

[54] METHOD OF AND APPARATUS FOR HEAT TRANSFER IN A FLUIDIZED BED

[75] Inventors: Jaroslav Beranek, Prague; Milos Kaspar, Jirkov; Vladimir Bazant, Prague; Antonin Chladek, Jirkov, all of Czechoslovakia

[73] Assignee: Ceskoslovenska akademie ved, Prague, Czechoslovakia

[22] Filed: Sept. 28, 1972

[21] Appl. No.: 293,024

[30] Foreign Application Priority Data
Sept. 29, 1971   Czechoslovakia................. 6916-71

[52] U.S. Cl..................... 34/10; 34/57 A; 34/57 C; 165/104; 423/659 F; 432/15
[51] Int. Cl........ F26b 3/08; F26b 17/10; B01j 9/18
[58] Field of Search...... 165/104; 122/4 D; 34/57 B, 34/57 C, 57 A, 57 R, 10; 23/288 S; 432/15; 75/9, 26; 423/659 F

[56] References Cited
UNITED STATES PATENTS

| | | | |
|---|---|---|---|
| 2,194,454 | 3/1940 | Greenawalt............................ | 75/9 X |
| 2,443,190 | 6/1948 | Krebs............................. | 23/288 S X |
| 2,690,962 | 10/1954 | Clarke............................. | 23/288 S |
| 2,761,769 | 9/1956 | Elder................................. | 23/288 S |
| 2,944,009 | 7/1960 | Huntley et al.................. | 23/288 S X |
| 3,053,642 | 9/1962 | Huntley et al..................... | 23/288 S |
| 3,140,168 | 7/1964 | Halley et al......................... | 75/26 X |
| 3,242,974 | 3/1966 | Goulounes...................... | 165/104 X |
| 3,243,318 | 3/1966 | Mihara et al. ....................... | 34/57 A |
| 3,447,338 | 6/1969 | Smith, Jr......................... | 165/104 X |

FOREIGN PATENTS OR APPLICATIONS

| | | | |
|---|---|---|---|
| 589,879 | 7/1947 | United Kingdom................. | 423/659 |
| 549,743 | 12/1957 | Canada..................................... | 75/9 |
| 736,686 | 9/1955 | United Kingdom...................... | 75/9 |
| 577,976 | 6/1959 | Canada.............................. | 122/4 D |

Primary Examiner—Albert W. Davis, Jr.
Assistant Examiner—Sheldon Richter

[57] ABSTRACT

The bed to be fluidized is initially supported upon a grid provided with a plurality of similar channels the channels shown being V-shaped vertical section, so that the cross-sectional area of the fluidized bed therein continuously increases from the bottom of the channel to the top. A fluidizing medium under pressure is introduced into the chamber containing the grid and the fluidized bed, the fluidizing medium being divided and caused to flow upwardly through the fluidized bed through a plurality of holes through the bottom and the side walls of the channels of the grid, such holes being disposed at varying heights and in such a way that the flowing fluid is uniformly distributed along the height of the fluidized bed. A plurality of pipes containing a heat exchanging fluid are disposed in the channels of the grid. The invention may be employed in a number of chemical as well as physical processes such as the combustion of fuels, the roasting of zinc concentrates, the roasting of pyrites, etc.

7 Claims, 1 Drawing Figure

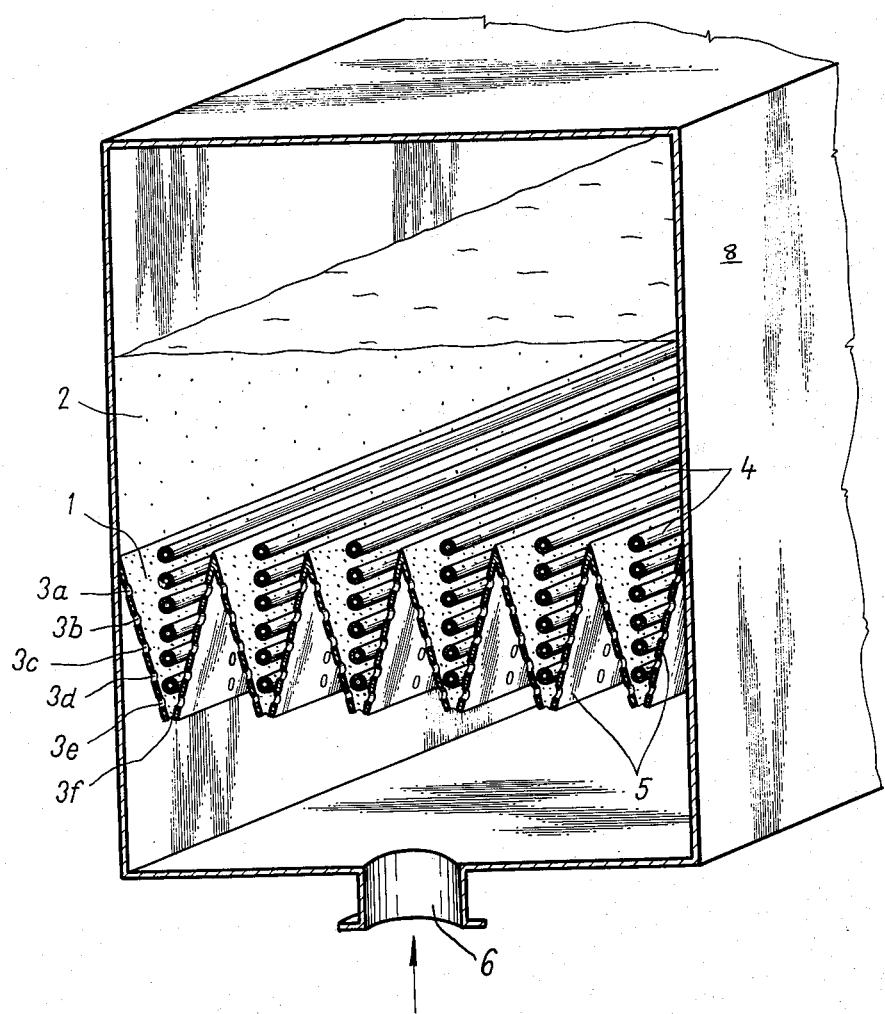

METHOD OF AND APPARATUS FOR HEAT TRANSFER IN A FLUIDIZED BED

This invention relates to a method of and an apparatus for heat transfer in a fluidized bed. The invention is related to the prior U.S. patent application Ser. No. 190,517, filed Nov. 19, 1971 by Beranek et al. and assigned to the assignee of the present application. In accordance with the invention, heat is transferred to or from the fluidized bed at a variable intensity, such intensity being dependent upon the flow rate of the fluidizing medium.

The principle of heat transfer from a non-homogeneous fluidized bed according to U.S. patent application 190,517 is based on the breaking up of the fluidized bed into separated fluidized beds with variable intensity of axial mixing of particles, the individual fluidized beds having various temperatures. The breaking up of the fluidized bed into separate fluidized beds is obtained by distributing the fluidizing medium into several streams with their separated introduction into the fluidized bed at various heights.

Distribution of the fluid into several separated streams complicates the construction and automatic control of the unit as the flow rates into each fluidized bed must be controlled separately. This is necessary in processes with a constant flow rate of the fluidizing medium. But the intensity of heat removal from the fluidized bed is frequently proportional to the quantity of the fluidizing medium. For example, the heat removed from a fluidized bed upon combustion is proportional to the amount of fuel introduced and thus to the oxygen comsumption. In this case, it is possible to arrange for the separation of the fluidized bed by changing the flow rate of the fluid.

The present invention is also based upon the disintegration or separation of the fluidized bed into particulate fluidized beds by introducing the fluid at various heights of the fluidized bed. In the present invention, however, distribution of the introduced fluidizing medium is made dependent upon the size of holes through the grid which are connected with the inlet pipe, upon the flow rate of the fluidizing medium, and upon the shape of the bed supporting grid and the fluidization vessel.

The principle of heat transfer to or from the fluidized bed, based upon the disintegration of the fluidized bed by changing the flow rate of the fluidizing medium, is illustrated in the drawing, wherein:

The sole FIGURE in a view partially in perspective and partially in section illustrating the method of the invention as employed in the cooling of fluidized bed.

The embodiment shown in FIG. 1 involves the combustion of coal in a fluidized bed. The bed is disintegrated or separated into two separated fluidized beds 1 (lower) and 2 (upper) by the introduction of the fluidizing medium e.g. 6 through holes $3a$ to $3f$ in a grid 5 in a chamber 8. The grid has a plurality of V-shaped channels, the holes $3a$–$3f$ being situated at various heights in the walls of the channels of the grid 5.

At the lowest flow rate of the fluidizing medium 6 the bed 2 becomes a fluidized one when the flow rate in the horizontal cross-section above the uppermost holes $3a$ equal the minimum fluidization velocity. The grid 5 separates the upper and lower parts of chamber 8, and so the amount of fluid passing through the cross-sectional area of the inlet 6 equals the amount of fluid passing through the holes $3a$ to $3f$. When the rate of fluid inlet flow is low, the bed between the holes $3a$ to $3f$ is stationary.

With an increasing inlet flow rate of the fluidizing medium at 6, the flow rate through all the holes $3a$–$3f$ finally becoming fluidized. In this way the lower surface or zone of the fluidized bed 2 moves to above the holes $3b$, so that heat is removed from those pipes of a cooling system 4 which are situated in the V-shaped channels of the grid 5 above the holes $3b$.

When the flow rate of the fluidizing medium is further increased, the lower surface of the fluidized bed 2 moves to above the lowermost holes $3f$ so that the whole cooling system 4 is surrounded by the fluidized bed; in this case the maximum heat removal from the fluidized bed 2 is obtained. The temperature of the fluidized bed and of the cooling fluid in cooling system 4 may be constant at any rate of heat removal.

The height of the zone or lower stationary bed 1 is dependent on the flow rate of the fluidizing medium which in turn is dependent upon the ratios of the cross-sectional areas of holes $3a$ to $3f$ and on the shape of the grid 5; these factors may be altered over a wide range.

If the necessary dependence of the intensity of heat removal upon the flow rate can not be reached by changing the diameters of the holes $3a$ to $3f$ and the shape of grid 5, it is possible to distribute the fluidizing medium into several streams and to introduce each of them into the fluidized bed through holes situated at various heights. For example, the fluidizing medium to holes $3a$ to $3c$ may be introduced and controlled independently of the flow rate to holes $3d$ to $3e$ etc., by providing separate conduits leading to the respective sets of holes, the various conduits being provided with their individual valves or dampers.

The method and apparatus of the invention for cooling or heating the fluidized bed may be employed in a number of chemical as well as physical processes e.g. in combustion of fuels, the roasting of zinc concentrates, the roasting of pyrites, etc, wherein the temperature of particles at their heat treatment can be changed by the described method of heat transfer.

The invention is illustrated and described with a reference to a preferred embodiment thereof and it is to be understood that it is in no way limited to said preferred embodiment but is capable of numerous modifications according to the appended claims.

What is claimed is:

1. Apparatus for creating a fluidized bed of particulate material and for exchanging heat therewith, comprising an enclosure defining a compartment, a fluidized bed-supporting grid disposed horizontally within the compartment intermediate the height thereof to divide the compartment into upper and lower sub-compartments, means to introduce a fluidizing medium under pressure into the lower sub-compartment, the grids having a plurality of channels therein with sidewalls, there being a plurality of holes through the sidewalls of the channels whereby to introduce said fluidizing medium into the bed through the holes, and a plurality of conduits for heat exchange fluid disposed at different heights in the channels in the grid.

2. Apparatus according to claim 1, wherein the cross-sections of the individual inlet holes in the grid are arranged in such a way that the flowing fluidizing medium is uniformly distributed along the height of the fluidized bed.

3. Apparatus according to claim 1, wherein the cross-sectional area of the channels in the grid and thus the lower part of the fluidized bed continuously increases with the distance from the lowest hole in the grid to the highest hole in the grid.

4. Apparatus according to claim 3, wherein the channels in the grid are V-shaped in vertical transverse section.

5. A method of exchanging heat with a fluidized bed of particulate material, comprising disposing a plurality of conduits for heat exchange fluid at different heights in the bed, and introducing a fluidizing medium into the bed at different heights at such a rate that in the lower part of the bed of particles a zone is created through which fluid flows at a rate near the minimum fluidization velocity, the height of such zone varying inversely with the total amount of fluid flowing through the fluidizing bed and varying within a range of heights below the the lowest conduit and above the highest conduit for heat exchange fluid, the geometrical arrangement, the number, the size, and the location of the conduits being determined by the requirements of maximum heat removal and heat supply into the fluid bed.

6. The method according to claim 5, wherein there are provided a plurality of individual fluid inlet ports for the bed, said ports being disposed at different heights in the bed, and arranging the cross-sections of the individual fluid inlet ports so that the inflowing fluid is evenly distributed along the cross-section of the fluidized bed throughout the height of the bed.

7. The method according to claim 5, wherein there are provided a plurality of individual fluid inlet ports for the bed, said ports being disposed at different heights in the bed, and wherein the cross-sectional area of fluidizing medium inlet ports continuously increases with the distance from the lowest port to the highest port in such a manner that the necessary change in the heat removal intensity from the fluidized bed corresponds to the change in the overall flow rate of fluid.

* * * * *